Patented Oct. 23, 1923.

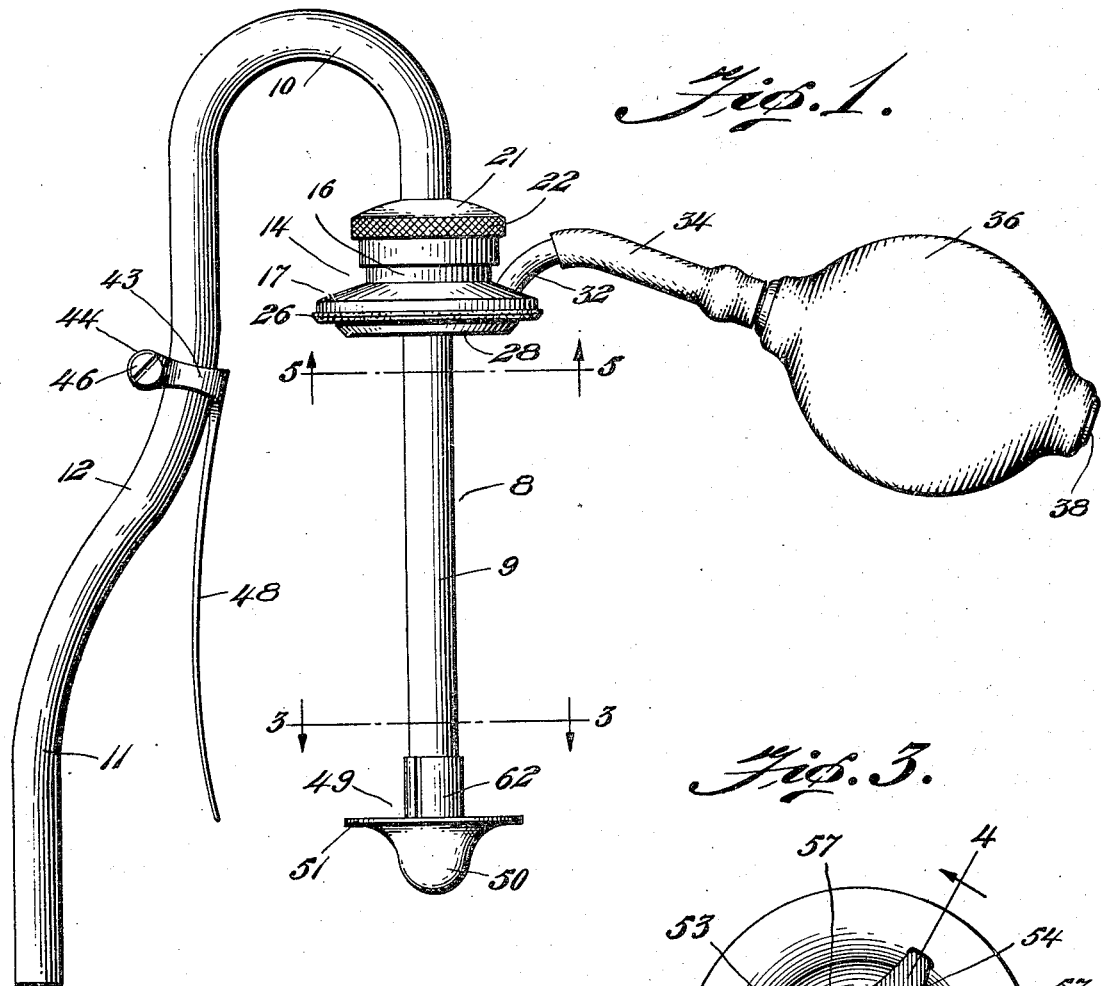
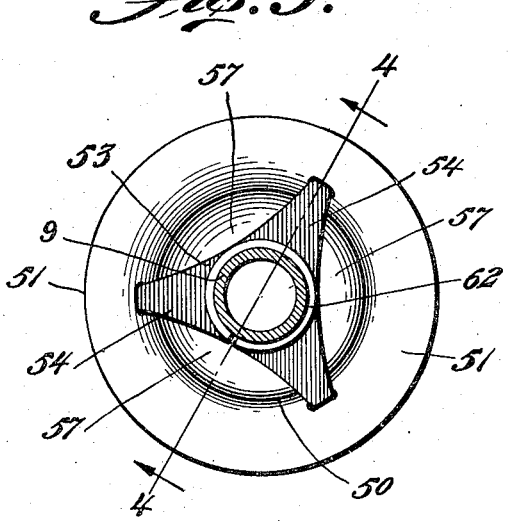
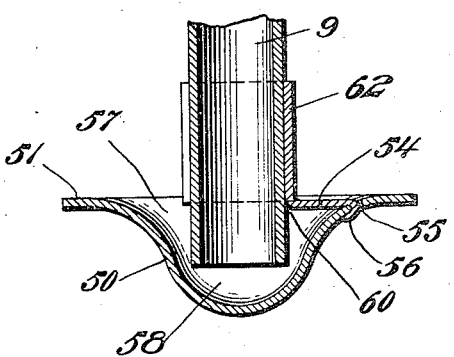

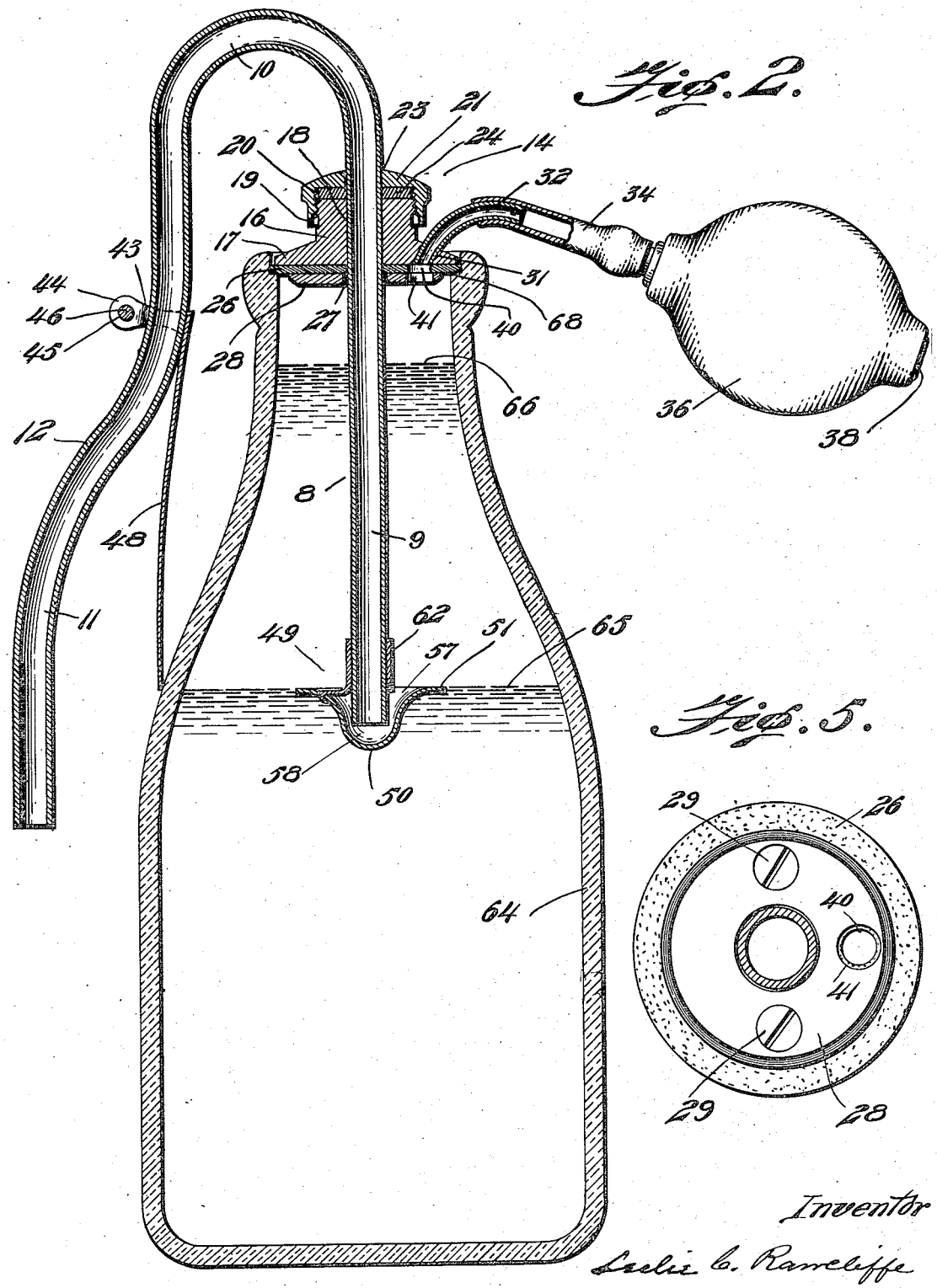

1,471,528

UNITED STATES PATENT OFFICE.

LESLIE C. RAWCLIFFE, OF FOXBORO, MASSACHUSETTS.

CREAM EXTRACTOR.

Application filed January 17, 1923. Serial No. 613,239.

*To all whom it may concern:*

Be it known that I, LESLIE C. RAWCLIFFE, a citizen of the United States, residing at Foxboro, in the county of Norfolk and State of Massachusetts, have invented certain new and useful Improvements in Cream Extractors, of which the following is a specification.

My invention relates to a device purposed to remove the cream from the milk in a milk bottle.

Heretofore the cream could be removed only by manual pouring which made complete and sole removal of the cream from the milk impossible.

The essential objects of my invention are to pneumatically and automatically remove the cream; to effect such removal completely and without inclusion of any milk; to gage the depth of the cream; to facilitate complete disengagement of parts for cleansing purposes, and to attain these ends in an inexpensive and simply operable structure.

To the above ends my invention consists in such parts and in such combinations of parts as fall within the scope of the appended claims.

In the accompanying drawings, constituting a part of this specification, and illustrating the principle of this invention, and the best mode now known to me for applying that principle, Figure 1 is a side elevation of my remover, Figure 2, a vertical central section, partially in side elevation, of the same mounted in a milk bottle, Figure 3, a section on line 3—3 of Figure 1.

Figure 4, a section on line 4—4 of Figure 3, and

Figure 5, a section on line 5—5 of Figure 1.

Like reference characters indicate like parts throughout the views.

In the present embodiment of my invention the assemblage may comprise in a general way a discharge pipe 8 comprising a vertical conducting portion 9 connected by an arched upper portion 10 to a depending discharge portion 11 extending to a plane below the lower end of the portion 9, and preferably slightly offset intermediate its length, as at 12. Slidably mounted on the pipe portion 9 is a stopper member or cover 14 comprising a body portion 16, and a circular base portion 17 of increased diameter. The stopper is provided with a central opening 18 to receive the pipe, and the portion 16 is provided with a thread 19 engaging a thread 20 in a cap 21, having an external milled portion 22 and provided with a central hole 23 to receive the pipe. Between the member 14 and the cap is an elastic packing ring 24 adapted to embrace the pipe. Covering the flat bottom face of the stopper portion 17 is a circular disk 26, of rubber or other frictional material of slightly greater diameter than the portion 17 and having a central hole 27 to snugly receive the pipe. The disk 26 is held in position by a retaining plate 28 attached to the portion 17 by screws 29, but this is not essential. The members 14, 21, 24, 26 and 28, assembled as described, constitute the cover, which is manually longitudinally slidable on the portion 9 of the pipe. The members 24 and 26 have sufficient frictional engagement with the pipe to insure an air tight closure without preventing movement of the cover on the pipe.

In a passage 31 extending downwardly through the member 14 is a curved metallic suction pipe or nipple 32 to which is fastened the rubber air pipe 34 of a common compressible air bulb 36 provided with the usual check valve 38 in its outer end. Registering with the passage 31 are holes 40 and 41 in the members 26 and 28 respectively.

Clamped around the pipe portion 11 is a split ring 43 having upon its ends clamping ears 44 with perforations 45 for the reception of a clamping screw 46. This ring is integral with the end of a depending indicator or gage finger 48. The latter is, therefore, adjustable longitudinally of the pipe.

A separator member 49 is provided comprising a cup 50 having a lateral horizontal flange 51. A triangular bridge plate comprising a body 53 and radial arms 54 is fixed to the top of the cup. The arms pass through slots 55 and have their ends 56 clinched upon the outer face of the cup. Resultant openings 57 between the arms 54 communicate with the chamber 58 of the cup. The center of the bridge portion 53 has a hole 60 adapted to slidably receive the end of the pipe portion 9 which extends nearly to the bottom of the cup. A longitudinally split sleeve 62 fastened to the bridge around the hole yieldingly clasps the pipe, and assists in retaining the cup in an adjusted position longitudinally of the pipe.

While the finger 48 and the separator 49 are both adjustable it will be noted that such adjustments are usually employed merely in the original construction of the extractor, and after such initial adjustment these members remain permanently in such adjusted positions, with the free end of the finger 48 in the horizontal plane of the separator flange 51.

In the drawings is shown a milk bottle 64 in which the top of the milk is indicated by the line 65; and the top of the cream, by the line 66. To remove the cream the cover 14 is applied to the bottle mouth, the periphery of the disk 26 resting on the usual internal annular shoulder 68 of the latter, forming a tight closure. The separator flange 51 should be in the horizontal plane of the milk line 65 when the extraction process begins. Therefore, preparatory to applying my device to a bottle, the cover 14 is positioned upon the rod only a short distance above the member 49. The member 14 is next seated on the shoulder 68 and the pipe portion 9 is manually pressed downwardly by the operator's hand on the loop 10 until the flange 51 reaches the milk line 65. During this descent the separator is invisible in the liquid so that the operator is guided solely by the finger 48. When the finger end in its descent reaches the plane of the milk line 65, which is visible through the transparent side of the bottle, the flange 51 is in required position. The cream extraction is effected by manually compressing the bulb 36 and forcing the air through the pipe 32 and the passage formed by the holes 40 and 41 down upon the cream in the bottle, thus forcing some of the latter through the openings 57, chamber 58, and the pipe portions 9 and 10, whereupon a siphoning operation starts drawing the remainder of the cream in the bottle out through the pipe portion 11, until the cream descends to the line 65 whereupon the entrance of air into the openings 57 breaks the siphoning action and the extraction is complete. Often a single compression of the bulb is sufficient to start the siphoning action. Thus the removal of the cream is pneumatic and automatic.

Having thus described one illustrative embodiment of my invention, it is understood that the specific terms employed are used in a descriptive sense only, and are not for the purpose of limitation, the scope of the invention being defined by the appended claims.

I claim:—

1. In a device of the character described, a milk bottle, a detachable plug on the bottle, a pipe on the plug communicating with the interior of the bottle, a bulb on the pipe, a siphon pipe comprising a conducting portion slidably mounted in the plug extending into the bottle, and a discharge portion exterior of the bottle, a separator within the bottle on the end of the conducting portion of the siphon pipe, and a gage finger on the discharge portion of the siphon pipe extending to the plane of the separator for contact with the side of the bottle.

2. In a device of the character described, a siphon pipe comprising a conducting portion and a discharge portion, a plug slidably mounted upon the conducting portion of the pipe comprising a body provided with a thread, a resilient disk upon the bottom of the body, and a cap upon the top of the body provided with a thread engaging the first thread, said body and disk being provided with a passage, an air pipe on the body communicating with the passage, a bulb on the air pipe, and a separator carried by the conducting portion of the siphon pipe and having a lateral flange at its upper end, and a depending gage finger on the said discharge portion for contact with the side of the bottle in the plane of said flange.

In testimony whereof I have affixed my signature.

LESLIE C. RAWCLIFFE.